United States Patent
Clark et al.

(10) Patent No.: US 12,247,525 B2
(45) Date of Patent: Mar. 11, 2025

(54) MANAGEMENT OF POWER TRANSITION FOR DRIVER ASSISTANCE

(71) Applicant: DEERE & COMPANY, Moline, IL (US)

(72) Inventors: Scott N. Clark, Bettendorf, IA (US); Michael T. Meschke, Eldridge, IA (US)

(73) Assignee: DEERE & COMPANY, Moline, IL (US)

( * ) Notice: Subject to any disclaimer, the term of this patent is extended or adjusted under 35 U.S.C. 154(b) by 62 days.

(21) Appl. No.: 17/983,902

(22) Filed: Nov. 9, 2022

(65) Prior Publication Data

US 2024/0151188 A1 May 9, 2024

(51) Int. Cl.
*F02D 29/02* (2006.01)
*F02D 41/04* (2006.01)
*A01D 69/00* (2006.01)

(52) U.S. Cl.
CPC ............. *F02D 29/02* (2013.01); *F02D 41/04* (2013.01); *A01D 69/00* (2013.01); *F02D 2200/604* (2013.01)

(58) Field of Classification Search
CPC .... F02D 29/02; F02D 41/04; F02D 2200/604; A01D 69/00
See application file for complete search history.

(56) References Cited

U.S. PATENT DOCUMENTS

| | | | | |
|---|---|---|---|---|
| 4,452,209 A * | 6/1984 | Ohara | ................. | F02D 41/1489 123/687 |
| 5,878,557 A | 3/1999 | Wyffels et al. | | |
| 6,176,779 B1 * | 1/2001 | Riesterer | .............. | A01D 46/084 56/28 |
| 7,945,378 B2 * | 5/2011 | Sheidler | .............. | A01D 41/127 701/110 |
| 8,230,667 B2 * | 7/2012 | Finkler | ................ | A01D 41/127 56/10.2 G |
| 9,127,436 B2 * | 9/2015 | Nakagawa | ........ | B60W 30/1882 |
| 9,163,376 B2 * | 10/2015 | Nicholson | ............ | E02F 3/3414 |
| 10,094,321 B1 * | 10/2018 | Anschuetz | .......... | F02D 41/2454 |

(Continued)

FOREIGN PATENT DOCUMENTS

| | | |
|---|---|---|
| DE | 102008036378 | 2/2010 |
| EP | 3259976 A1 | 12/2017 |
| EP | 3300584 | 4/2018 |

*Primary Examiner* — Carl C Staubach
(74) *Attorney, Agent, or Firm* — Taft Stettinius & Hollister LLP; Stephen F. Rost

(57) ABSTRACT

A work machine and a method of controlling work machine power of the work machine during a harvesting operation for harvesting a crop. The work machine may include an engine, a hybrid machine, or an electric machine. The work machine may operate by identifying a state of a driver assistance selector that includes a manual mode and an automatic mode. While in the manual mode, the work machine may operate at a nominal power target, and, when in the automatic mode, the work machine may operate at an enhanced power target for harvesting. When the driver assistance feature changes from the automatic mode to the manual mode, the transition between the enhanced power to the nominal power may be reduced over a predetermined period of time to optimize machine drivability and system performance.

18 Claims, 10 Drawing Sheets

(56) References Cited

U.S. PATENT DOCUMENTS

| | | | |
|---|---|---|---|
| 11,015,544 B2* | 5/2021 | Musumeci | F02D 41/263 |
| 11,439,064 B2* | 9/2022 | Sheidler | F02D 41/021 |
| 2003/0075145 A1* | 4/2003 | Sheidler | F02D 31/007 |
| | | | 123/396 |
| 2008/0047245 A1* | 2/2008 | MacGregor | B60K 6/12 |
| | | | 56/10.8 |
| 2008/0209878 A1 | 9/2008 | Farley | |
| 2017/0370303 A1* | 12/2017 | Altmann | A01D 41/127 |
| 2018/0042173 A1* | 2/2018 | Henson | A01D 69/02 |
| 2022/0039319 A1 | 2/2022 | Sheidler | |
| 2023/0029905 A1 | 2/2023 | Clark | |

* cited by examiner

MANAGEMENT OF POWER TRANSITION FOR DRIVER ASSISTANCE

FIELD OF THE DISCLOSURE

The present disclosure relates to an agricultural work machine and, more particularly, to crop harvesters having varied power demands during the harvesting of a crop.

BACKGROUND

Agricultural equipment, such as a tractor or a self-propelled harvester, includes mechanical systems, electrical systems, hydraulic systems, and electro-hydraulic systems. Each of these systems is typically powered by an engine or motor. The agricultural equipment is designed to power each system based on power demand. The allocation of power among each of the systems is determined based on power requirements during equipment operation.

For instance, one type of harvester includes a self-propelled harvester having different systems for cutting crop and moving the crop through the harvester. A first type of header that can be coupled to a harvester is a draper header that is arranged to be moved in a forward direction over a field. A draper header may be used to harvester wheat. The draper header includes a laterally extending frame supporting a laterally extending cutter bar. Draper conveyers, located on the header, include a draper belt having a feeding direction from an outer side end towards a center of the header. A central conveyor is disposed between a left and a right draper belt conveyors. The left and right draper belt conveyors receive cut crop material and convey the cut crop material rearward through a central aperture. The harvested crop material is directed through the central aperture, for instance, to a thresher where grain is separated from the plant stalk and delivered to an onboard storage bin. When grain in the onboard storage bin reaches a selected level, the grain is unloaded, such as to a grain cart.

Another type of header is a corn header that is configured to harvest corn. The corn header includes a plurality of row units that receive stalks of corn. The row units include stalk rollers and deck plates that strip the ears of corn from the stalks. The stalks are discarded onto the ground, and the ears of corn are received onto the corn header. Kernels of corn (or, more generally, grain) are separated from a respective cob and are stored in an onboard storage bin for later unloading from the harvester.

When harvesting cotton, cotton from cotton plants is harvested by a self-propelled mobile harvester. The harvester may include a header that engages the cotton plant to remove the cotton from the field. The removed cotton is delivered to a basket that receives and holds the harvested cotton. Known baskets for holding cotton can include an apparatus for compacting the cotton into a round bale primarily to increase the amount of cotton in the bale. Once the bale has reached a predetermined size, the bale is discharged.

Harvesters used to harvest grains using a draper header or corn header, for example, and harvesters used to harvest cotton can include a cab where an operator is located to operate and monitor the operation of harvester. The cab includes operator controls, often including a display, to provide the operator with harvester status as well as to provide operator controls for adjusting the operation of the harvester.

Harvester for harvesting grains (e.g., corn or wheat) and cotton include a propulsion system. Generally, the propulsion system includes an engine coupled to a transmission. The transmission is, in turn, coupled to a drive train.

Many harvesters include hydraulic pumps that act as one of the consumers of power generated by the engine. In the harvesters used to harvest grains (e.g., corn or wheat), an auger is used to unload the threshed grain from the onboard storage bin. When the auger is actuated, power is required to unload the grain. For a cotton harvester, cotton is collected and can be formed into a bale. Once the bale is formed, power is required to eject the bale from the harvester by a bale handler and to unload to the ground or to another piece of equipment.

SUMMARY

In one implementation of the present disclosure, a method of controlling power of an engine of a work machine during a harvesting operation includes identifying a state of a driver assistance selector that is changeable between a first state and a second state. In the first state, the method includes operating the work machine in a manual mode and the engine according to a first power curve, and in the second state, the method includes operating the work machine in an automatic mode and the engine according to a second power curve, where the second power curve is greater than the first power curve. The method also includes determining if the driver assistance selector is changed from the second state to the first state, and when it is determined that the driver assistance selector is changed from the second state to the first state, transitioning the work machine from the automatic mode to the manual mode and the engine from operating according to the second power curve to the first power curve over a period of time.

In one example of this implementation, the method includes providing a plurality of power curves including the first power curve and the second power curve, where the second power curve comprises a maximum power curve of the plurality of power curves; wherein operating the work machine in the automatic mode comprises operating the engine according to the maximum power curve. In a second example, the method includes operating the work machine in the automatic mode includes operating the engine at a target power greater than any power available on the first power curve. In a third example, the operating the work machine in the automatic mode includes operating the engine at the target power of at least 110% of a maximum power on the first power curve.

In a fourth example of this implementation, the operating the work machine in the automatic mode includes operating the engine at the target power of between 100% and 110% of a maximum power on the first power curve. In a fifth example, the operating the work machine in the manual mode includes operating the engine at a first maximum power on the first power curve, wherein operating the work machine in the automatic mode includes operating the engine at a second maximum power on the second power curve, the second maximum power being greater than the first maximum power. In a sixth example, the method includes operating the engine according to a third power curve of the plurality of power curves, the third power curve comprising a third maximum power, where the third maximum power is less than first maximum power.

In a seventh example, the transitioning the work machine includes transitioning the engine over a period of time from operating between two successive power curves of the plurality of power curves, wherein the period of time is the same when transitioning the engine between any two successive power curves. In another example, the transitioning the work machine includes transitioning the engine over a period of time from operating between two successive power curves of the plurality of power curves, wherein the period of time is the different when transitioning the engine between any two successive power curves. In a further example, the method includes controlling the work machine at a predefined speed when operating in the automatic mode. In yet a further example, the transitioning the work machine from the automatic mode to the manual mode includes transitioning to the manual mode if the work machine is operating at the predefined speed.

In another implementation of the present disclosure, a work machine including a harvesting system includes an engine configured to output power based on one of a plurality of power curves including a first power curve and a second power curve, the second power curve being greater than the first power curve. An auxiliary power system is operatively coupled to the engine and configured to output power to the harvesting system, and a driver assistance selector is changeable between a manual mode and an automatic mode. A controller is operatively coupled to the engine and to the auxiliary power system, where the controller includes a processer and a memory configured to store program instructions. The processor is configured to execute the stored program instructions to identify if the driver assistance selector is in the manual mode or in the automatic mode; when the identified driver assistance selector is in the manual mode, operate the engine according to the first power curve; when the identified driver assistance selector is in the automatic mode, operate the engine according to the second power curve; identify when the driver assistance selector changes from the automatic mode to the manual mode; and in response to the change from the automatic mode to the manual mode, transition the engine from operating according to the second power curve to the first power curve over a predetermined period of time.

In one example of this implementation, the second power curve includes a maximum power curve of the plurality of power curves. In a second example, the first power curve includes a first maximum target power and the second power curve includes a second maximum target power, the second maximum target power being greater than the first maximum target power. In a third example, the second maximum target power is at least 110% of the first maximum target power.

In another example of this implementation, the transition from the second power curve to the first power curve includes a linear decrease in power over the predetermined period of time. In yet another example, the transition from the second power curve to the first power curve includes a non-linear decrease in power over the predetermined period of time.

In a further implementation of the present disclosure, a method of controlling power of an engine of a work machine during a harvesting operation, the method includes providing a plurality of power curves including a first power curve and a second power curve, where the second power curve is greater than the first power curve. The method includes identifying a state of a driver assistance selector that is changeable between a first state and a second state. In the first state, the method includes operating the work machine in a manual mode and the engine according to the first power curve, and in the second state, the method includes operating the work machine in an automatic mode and the engine according to the second power curve. The method also includes controlling a speed of the work machine at a predetermined speed in the second state and determining if the driver assistance selector is changed from the second state to the first state. When the driver assistance selector is moved to the first state, the method includes transitioning the work machine from the automatic mode to the manual mode, adjusting the engine from operating according to the second power curve to the first power curve over a period of time, and controlling the speed of the work machine to the predetermined speed.

In one example of this implementation, the adjusting the engine includes a linear reduction of power from the engine over the period of time. In another example, the adjusting the engine includes a non-linear reduction of power from the engine over the period of time.

BRIEF DESCRIPTION OF THE DRAWINGS

The aspects of the present disclosure and the manner of obtaining them will become more apparent and the disclosure itself will be better understood by reference to the following description of the implementations of the disclosure, taken in conjunction with the accompanying drawings, wherein.

Corresponding reference numerals are used to indicate corresponding parts throughout the several views.

DETAILED DESCRIPTION

Figure 1:
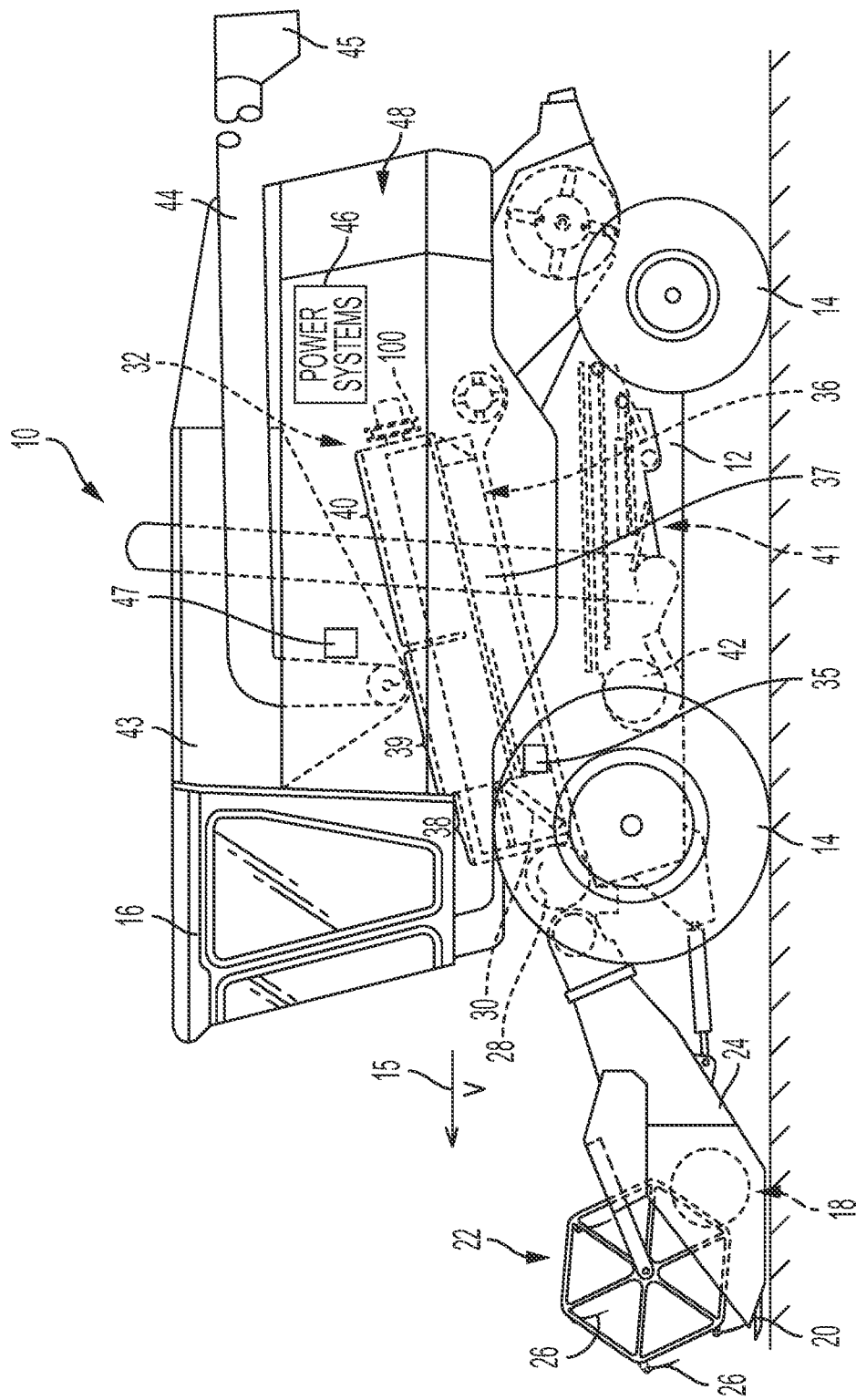
FIG. 1 is an elevational side view of an example harvester.

For the purposes of promoting an understanding of the principles of the present disclosure, reference will now be made to the implementations described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

While harvesters of different types are described herein, each of the harvesters performs some type of agricultural work and each is generally referred to as a work machine in the present disclosure.

The present application is related to application Ser. No. 17/391,146 having a priority date of Aug. 2, 2021, and having the title of Predictive Power Boost Demand System for an Agricultural Vehicle, the disclosure of which is incorporated herein by reference in its entirety.

Figure 2:
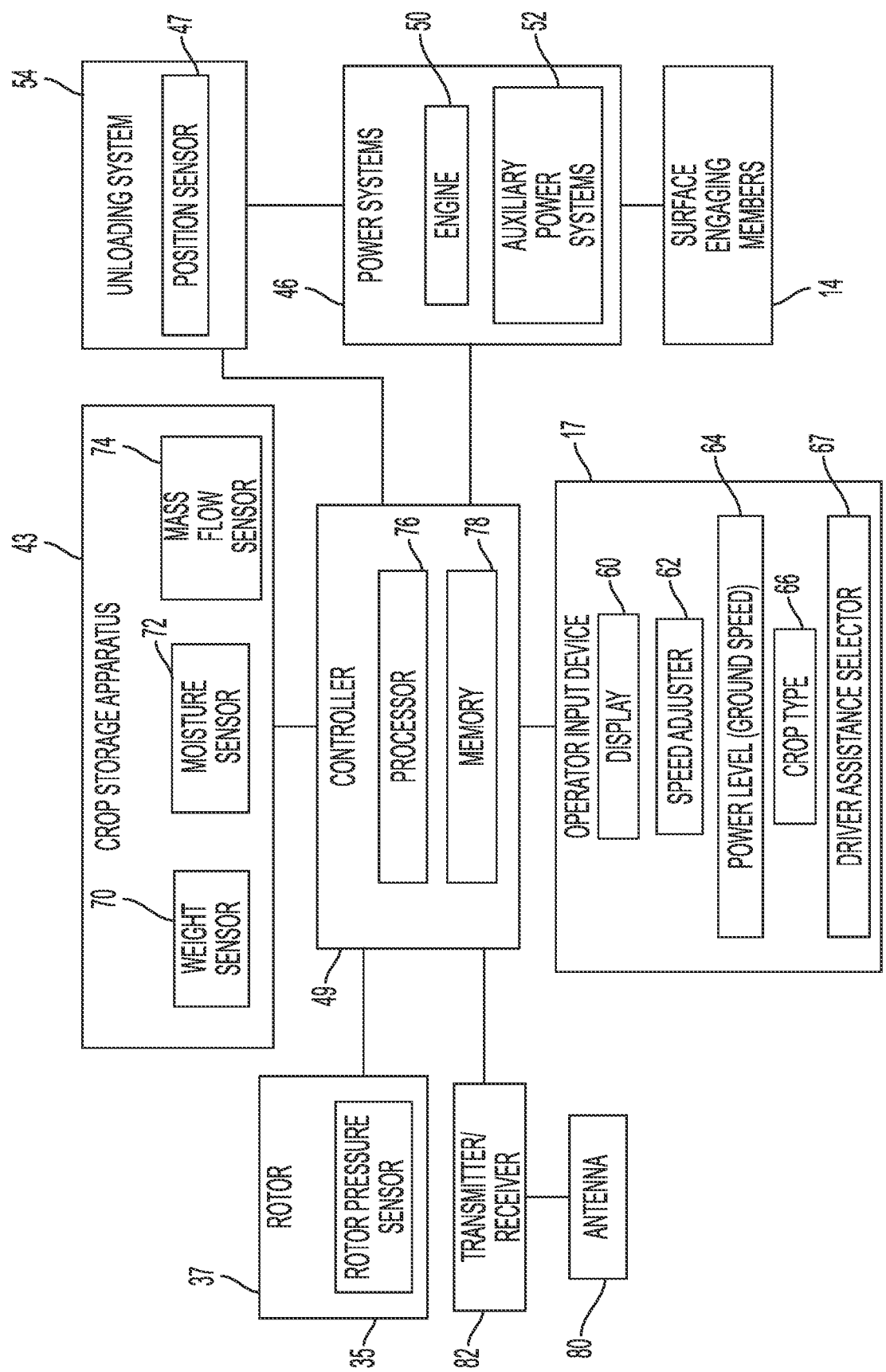
FIG. 2 is a block diagram of various hardware of an example harvester.

FIG. 1 illustrates one implementation of a harvester 10 including a chassis 12 with wheels 14 in contact with the ground. Wheels 14 are coupled to the chassis 12 and are used for transporting the harvester 10 over the ground, such as propelling the harvester 10 in a forward operating or travelling direction 15. Surface engaging members other than wheels are contemplated, such as tracks. The operation of the harvester 10 is controlled from an operator's cab 16. The operator's cab 16, in different implementations, includes one or more controls located at an operator input device 17, as shown in FIG. 2, for controlling the operation of the harvester 10. A draper header 18 is disposed at a forward end of the harvester 10 and includes a cutting knife or cutterbar 20 to cut crop being harvested. Applicable crops includes any variety and types of different crops, including wheat, soybeans, sorghum, barley, and other grains. At the same time the grain is cut, a pickup reel assembly 22 rotates, as understood by those skilled in the art. The pickup reel assembly 22 urges crop rearward as the crop is severed by a cutterbar. In this way, the severed crop falls onto draper belts for movement to a center conveyor. The pickup reel assembly 22 includes a plurality of fingers 26. The fingers 26 urges the crop over the cutterbar 20, and the cutterbar cuts the crop. The cut crop is conducted by a guide drum 28 and directed by the slope conveyor 24 to an inlet transition section 30, i.e., feederhouse. The inlet transition section 30 directs the cut crop to a harvested crop processing arrangement 32.

The crop processing arrangement 32 includes, in one or more implementations, rotor housing 36 and a rotor 37 located inside the housing 36. A rotor pressure sensor 35 is located at the rotor 37 to determine a flow of harvested crop being delivered from the crop processing arrangement 32. The rotor 37 includes a drum 100 to which crop processing elements for an infeed section 38, threshing section 39, and separating section 40 are affixed. The infeed section 38 is at the front of the crop processing arrangement 32. Longitudinally downstream and rearward from the infeed section 38 are threshing section 39 and separating section 40. The portion of the drum 100 for the infeed section 38 is typically frusto-conical in shape, extending rearwardly toward the threshing section 39 of the drum 100, although the drum 100 can also be cylindrical in shape. The threshing section 39 can also be frusto-conical in shape, although, in some arrangements, the threshing section 39 has a front portion that is frusto-conical in shape, and a rear portion that is cylindrical in shape. The rear portion of the crop processing arrangement 32 includes the separating section 40 of the drum 100, which is cylindrical in shape.

Grain and chaff that fall through the crop processing arrangement may be directed to a cleaning system 41 with a blower 42. The cleaning system 41 removes the chaff and guides the clean grain to an elevator for the clean grain (not shown). The elevator deposits the clean grain into a bin 43, i.e., an onboard container or tank, where the grain is stored temporarily. The deposited grain is unloaded by a conveyor 44 having an outlet 45 to a wagon, trailer, or truck, or other off-board container. The conveyor 44 is movable from an unloading position, as illustrated in FIG. 1, to a loading position, described later herein. A position sensor 47 is located, in one implementation, next to the conveyor 44 to determine the location of the conveyor. In one or more implementations, the conveyor 44 is an auger. The position of the auger 44, while the harvester 10 is harvesting, is illustrated in FIG. 1. When the harvester 10 is placed in the unloading mode, the auger 44 is moved to a position extending from and inclined with respect to the traveling direction 15. The inclined position is often perpendicular to the traveling direction 15. As the auger position is changed, the position sensor 47 provides a signal to a controller 49 indicating the auger position in the harvesting position or the unloading position. In one or more implementations, the controller 49 is one component of an electronic control unit including additional components and parts as is understood by one skilled in the art.

While the harvester of FIG. 1 is configured for harvesting a particular type of grain, e.g., wheat, the present disclosure includes a harvesting system and process for harvesting many types of grains, including corn. Differences in grain types require different amounts of power for harvesting and unloading, where the power required depends on the properties of the individual kernels of grain such as, for example, moisture, geometrical shape, size, density, and weight. For example, when comparing the harvesting of corn to the harvesting of wheat, corn harvesting may require more power than wheat harvesting. In addition, the unloading of corn from the onboard storage container generally occurs more often, for example, due to increased crop yields of corn relative to wheat. Consequently, the present disclosure applies to different harvester types, including harvesters for harvesting many different types of crops including, but not limited to, cotton.

A plurality of power systems 46 are supported by the chassis 12 and are located within a housing 48 of the harvester 10. The harvester 10 includes different power systems including, for example, mechanical, hydraulic, pneumatic, electric, and electronic power systems for propelling the harvester 10 and for controlling various processing equipment and systems. These power systems include an engine 50, as shown in FIG. 2, for providing power for the harvester, including powering a transmission system of the harvester. The engine 50 also provides power used by auxiliary power systems 52 such as grain handling, and cotton module building systems, if the harvester is harvesting cotton. The engine 50 provides a generally constant amount of power during a harvesting process. The systems used during harvesting are also known as power sinks. Besides the engine power being utilized for harvesting process control, engine power is also provided to control an environment of the cab 16, using dedicated auxiliary power systems 52 for heating and air conditioning. While internal combustion engines are described herein, other means of propulsion may be included such as hybrid machines and electric machines.

The power systems 46 also provide power for those harvesting systems that do not continuously require power but are considered auxiliary power systems. These harvesting systems include systems for unloading grain from the harvester with an auger or systems including a module build/ejection system for module building of cotton or bale building of hay. These harvesting systems require power that is anticipated or predictable based on an amount of harvested crop, such as grain or cotton. Once harvested, the harvested crop is unloaded by the harvester to an off-board container such as a truck, wagon, bin, ground, or other location. Once unloaded, the crops are delivered for transport to or use by a customer or other user of the crops.

Harvester power required for harvesting crop is based on the speed of the harvester as well as the harvesting systems used to harvest the crop. The power being provided for unloading the harvested product from the harvester is considered to be an anticipated or predictable power that is not required until an unloading system 54 (shown in FIG. 2) is required. The anticipated power, when delivered, is an unloading power used to discharge or unload the harvested product. The unloading system 54 includes the position sensor 47. As described herein, moving harvested crop from the harvester of any type shall be considered as a "discharge" of crop from the harvester.

A conventional harvester for harvesting grain may include a "power boost" function that uses available reserve power only made available when the harvester's grain auger is being used. To ensure that the reserve power is available, the harvester typically does not operate the engine at a maximum available power level while harvesting to insure that the reserve power is available when needed. When unloading crop, the reserve power is delivered to the unloading system, i.e., a harvesting system, that offsets the power required by the harvester to handle grain. Reducing the power provided by the engine during a harvesting operation, however, in anticipation of an unloading operation, reduces the overall productivity of the harvesting operation. The reduced efficiency is typically a reduction in the speed of the harvester as the harvester travels through the field being harvested. In order to better utilize the maximum available power of the engine, conventional harvesting systems leverage a power boost curve, instead of a nominal curve used during the harvesting of crop. While the conventional harvesting system of providing a "power boost" function provides for unloading of grain while harvesting, the conventional harvesting system is relatively inefficient as the harvester's available power is not fully utilized either during the harvesting operation or the unloading operation.

In other examples of harvester power management, a maximum power curve may be provided with no additional reserve for power boost. This harvesting system, however, can be problematic when an unloading-on-the-go scenario is presented, i.e., grain is unloaded as the harvester continues to harvest grain. The instant power demand results in an insufficient amount of power available to combat the unloading power requirement. This results in a significant reduction of performance as no power "boost" can be provided by the engine. Additionally, when power is utilized with no boost, the power bulge is sacrificed as the additional request for power slows engine speed, creates inefficiency in the separating and cleaning system, and poses operator drivability discomfort or even belt and hardware downtime failures. As described herein, "boost" is defined as a difference between a nominal power curve and a maximum power curve at the same speed of the harvester. "Bulge" is defined as the difference between different power values along the same power curve.

To combat the aforementioned problem, the present disclosure includes one or more implementations that utilize the harvester's current performance. In one implementation, the harvester includes known system power requirements that are considered in combination with the power required for unloading harvested crop to provide a "target" speed. The target speed is defined as the speed at which the harvester continues to harvest crop while unloading the harvested crop at the same time. While the target speed may be less than the operating harvest speed, for example, the target speed enables unloading of crop without a reduction in harvest speed. The "target" speed may be determined prior to activating the unloading system and may be used to adjust the harvester speed. The target speed enables the harvester to provide a "target" power that is made available to unload the harvested crop.

In different implementations, the target speed may be presented to the operator at the operator input device 17, or the speed of the harvester may be adjusted automatically to the "target speed". In one implementation, referred to as a manual mode, the display 60 presents the target speed to the operator who then manually adjusts the harvester to the target speed. In another implementation, referred to as an automatic mode, the "target" speed is incorporated into an automated drive system for the work machine. The automated drive system identifies a time at which unloading of harvested crop will begin prior to the unloading device, e.g., an auger, being deployed. In the automatic mode, the harvester is harvesting at a currently known and predetermined "nominal" power, but the harvester will ramp down the harvester speed to acquire a power target prior to unloading of the harvested crop. In one implementation, maximum harvesting power, i.e., the nominal power, is provided continuously during a harvesting operation, but is reduced prior to an unloading operation. As described herein, the power target is defined as a power curve or a targeted location on a power curve identified by the driver assistance system when operating in the automatic mode.

The automated drive system relies on one or more predictive inputs to determine the target speed and the target power. The predictive inputs include, but are not limited to, crop area harvested with yield map data, grain weight from active yield calibration system(s), or a grain bin 43 level of ¾ full or greater.

As shown in FIG. 2, the harvester 10 includes the rotor pressure sensor 35 disposed at a transition between the inlet transition section 30 and the rotor 37, which determines the total crop being processed. The rotor pressure sensor 35 determines the flow, i.e., speed, at which the crop is being harvested. The rotor pressure sensor is used to determine crop flow biomass and the power required for the threshing system.

The bin 43, identified as a crop storage apparatus in FIG. 2, in one or more implementations, includes a weight sensor 70, a moisture sensor 72, and a mass flow sensor 74. Each of the sensors 70, 72, and 74 is used, in different implementations, to determine the characteristics of the grain located within the bin 43. Signals from these sensors are used by the controller 49 as inputs to determine when the bin 43 is sufficiently full to be unloaded by the auger 44. The mass flow sensor 74 is configured to determine the flow rate of grain being deposited into the bin 43, such as by grain level within the bin 43. In other implementations, a sensor may measure discharged crop flow or power requirements needed to discharge the crop.

The controller 49, in some implementations, may be a single controller or a plurality of controllers operatively coupled to one another. The controller 49 includes one or both of a hardwired connection or a wireless connection operatively coupled to other components of the work machine 10, such as the engine 50, auxiliary power systems 52, sensors 35, 47, 70, 72, 74 and the operator input device 17. The controller 49, in several implementations, is operatively coupled to the aforementioned components via Wi-Fi, Bluetooth, or other known methods of wireless communication. Thus, the controller 49 is housed by the work machine 10 or positioned remotely from the work machine 10.

The controller 49, in different implementations, includes a computer, computer system, or other programmable devices. The controller 49 includes one or more processors 76 (e.g., microprocessors), and an associated memory 78, which can be internal to the processor or external to the processor. The memory 78 can include random access memory (RAM) devices including the memory storage, as well as any other types of memory, e.g., cache memories, non-volatile or backup memories, programmable memories, or flash memories, and read-only memories. In addition, the memory can include a memory storage physically located elsewhere from the processing devices and can include any cache memory in a processing device, as well as any storage capacity used as a virtual memory, e.g., as stored on a mass storage device or another computer coupled to controller 49. The mass storage device can include a cache or other dataspace, which can include databases. Memory storage, in other implementations, is located in the "cloud", where the memory is located at a distant location that provides the stored information wirelessly to the controller 49 through an antenna 80, typically supported by the housing 48 of the work machine that receives or transmits information from the distant location with a transmitter/receiver 82. The transmitter/receiver 82 is operatively coupled to the controller 49.

The controller 49 executes or otherwise relies upon computer software applications, components, programs, objects, modules, or data structures, etc. Software routines, resident in the included memory 76 or other memory, are executed in response to the signals received from the sensors as well as information received from the transmitter/receiver. In other implementations, the computer software applications are located in the cloud. The executed software includes one or more specific applications, components, programs, objects, modules or sequences of instructions typically referred to as "program code". The program code includes one or more instructions located in memory and other storage devices that execute the instructions that are resident in memory, which are responsive to other instructions generated by the system, or which are provided by the operator input device 17. The processor is configured to execute the stored program instructions.

The operator input device 17 includes a display 60, a speed adjuster 62, a power level indicator 64, a crop type selector 66, and a driver assistance selector 67. In one implementation, the display 60 is used to manually maneuver the machine to the target speed. In another implementation, the maneuvering of the machine to the target speed is incorporated into an automated drive system for the work machine to allow the automated drive system to identify: i) when the unloading auger is out, or ii) the machine is harvesting at the "nominal" power, and begin to ramp down speed to acquire the power target prior to the event. Crop area harvested with yield map data, grain weight from active yield features, or grain bin level of ¾ full or greater can also be used, for example, as predictive inputs. In one implementation, the speed adjuster 62 is a hydro handle that adjusts machine ground speed to the constant speed operation of harvesting.

In one or more implementations, map data is used to determine the nominal power required to harvest the crop. In one example, the map data is used to determine the load experienced by the harvester during harvesting, and this map-based load is used by the controller 49 to predict when to ramp down work machine speed in anticipation of an unloading event. In one implementation, site map data is stored in the memory 78 and includes a starting profile map that includes terrain information that includes slope and/or height information used to identify the harvesting power needed for the particular terrain. This map, detailing an unharvested condition of a field, further includes in one or more implementations, data that affects harvesting power such as topography, soil type, planted crop inputs, vegetative index, crop moisture, and biomass and/or crop density. These inputs are available on board the harvester from technological inputs provided by work machine sensors such as 2D and 3D sensors that examine the terrain as well as map based farming applications, such as planters, nutrient applicators, drones, geographic information systems (GIS) data, prior years' harvest record data, and other sources of data that is used to determine harvesting power required.

In these and other implementations, the map data may include real time updated map data that tracks the location of the work machine within the field being harvested, as well as an amount of time that has transpired from the start of the harvesting process or a return to the harvesting process once unloading has occurred. By knowing the amount of time that has transpired and the amount of crop harvested as well as the harvesting power required, an unloading event may be predicted and is used to initiate the unloading. In addition, once the unloading event has concluded, the real time updated map data between the last unloading event to the next unloading event may be predicted. This data, in different implementations, is based on work machine speed, terrain information, and crop information. Work machine speed information may be, for example, determined on the harvester itself, such as wheel speed sensor inputs, or by a GPS system.

The predictive inputs, such as those from the sensors, the map data, as well as a current harvesting ground speed and the power required to maintain the work machine and its included power systems 46 are used to control the work machine speed during harvesting. In addition, the predictive inputs may be used in different implementations to prepare for unloading the grain from the bin 43 when the work machine is stationary, unloading the bin 43 while the work machine is moving, and returning the work machine to a harvesting speed and related power systems for harvesting after the bin is unloaded. In one implementation, the work machine is operated at a first harvesting speed, typically a "nominal" maximum speed considered to be appropriate for the work machine, and field and grain conditions. The "nominal" maximum speed is based on a "nominal" maximum power. This harvesting power, required to operate the work machine during harvesting without unloading, is a first harvesting speed determined by the controller. The controller 49, which monitors the grain level in the bin, also determines a time in the future at which the grain should be unloaded. Using this information, a reduced speed of the work machine, a second harvesting speed, is determined based on the unloading power required. To unload the crop, the speed of the work machine is reduced from the first harvesting speed to the second harvesting speed, to reduce the harvesting power, and the extra power available is directed to the unloading of the grain. In this way, a nominal maximum power is used for both harvesting alone and harvesting while unloading crop. Once the unloading of crop is complete, the nominal maximum power is used solely for the harvesting of crop. In this way, the work machine power systems operate at a maximum power during both harvesting and unloading, but the maximum power is directed from powering only harvesting work machine functions to a combination of harvesting at a reduced work machine speed and the unloading of grain. The feature enables a greater 'nominal' maximum power for normal harvesting conditions without sacrificing the power boost necessary to maintain work machine drivability when activating the systems generally associated with boost power demand.

Figure 3:
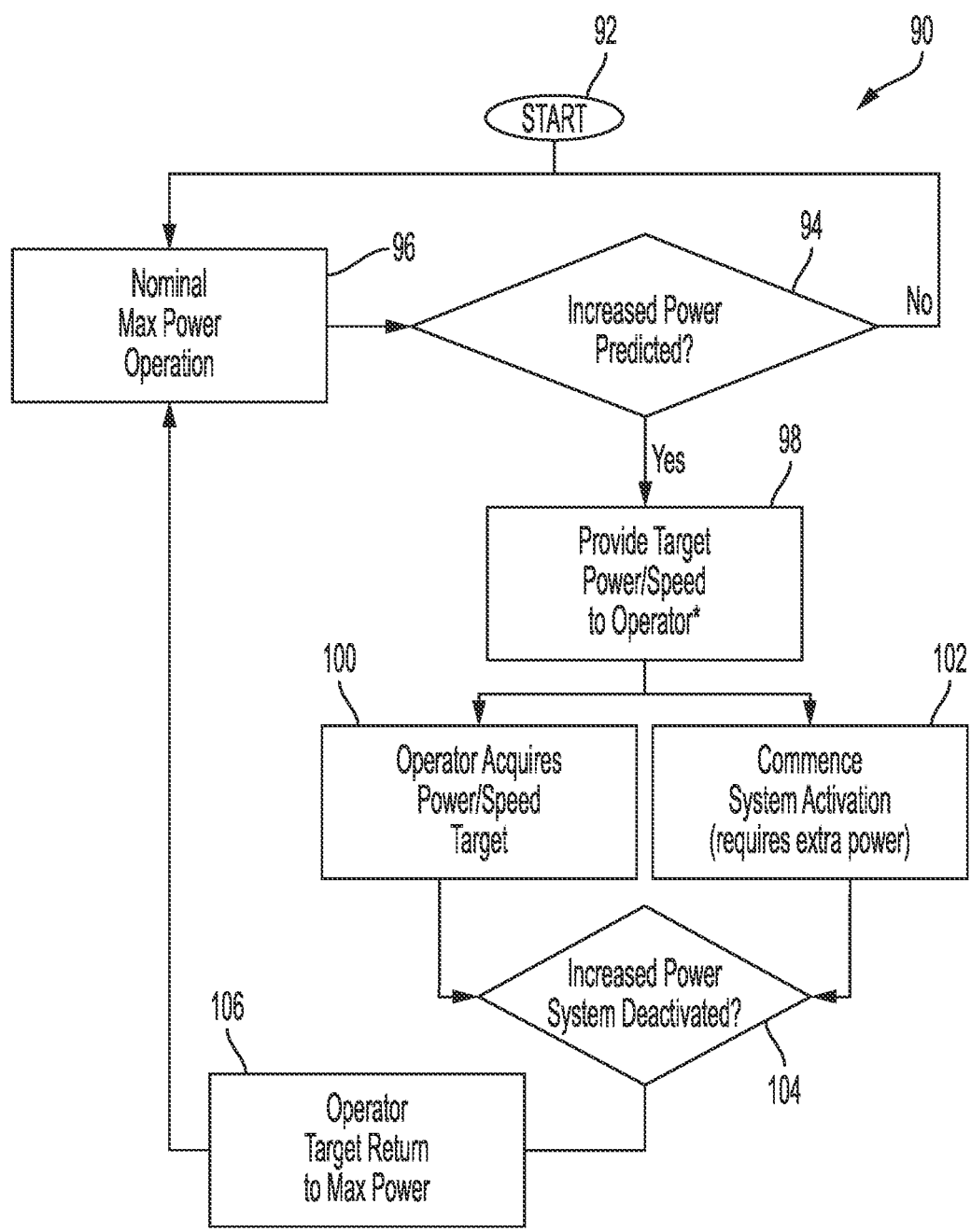
FIG. 3 illustrates one implementation of an example operating process for a harvester.

FIG. 3 illustrates one implementation of an example of an operating process 90 for the work machine 10 to manage the power systems 46 while harvesting crop and unloading the harvested crop. The process 90 is a semi-automated or manual operation that begins at start block 92. At block 92, the harvester 10 is harvesting crop at a speed that relies on the nominal maximum power, i.e., nominal "maximum" power. At this speed, the harvester is moving through a field using the nominal maximum power that is determined to be the power at which the work machine operates during a harvesting operation while not unloading crop or being prepared for unloading crop. The nominal maximum power is determined according to one or more of the type of work machine, the type and characteristics of the crop being harvested, and the terrain. The nominal maximum power is the factory stock power offered by the manufacturer and is typically not configurable or influenced by an operator or condition. Generally, the nominal maximum power is limited by hardware limitations or product power portfolios.

When the work machine 10 is in a fully operational mode while harvesting crop, typically a steady state speed, the controller 49 receives the sensor inputs from the rotor pressure sensor 35, the weight sensor 70, the moisture sensor 72, and the mass flow sensor 74. Based on these inputs, the controller 49 determines at block 94, whether an unloading power is needed to unload the grain. Because one or more of the inputs are transmitted in real time to the controller 49, the unloading power, i.e., a predicted power, that is determined for an unloading operation by the controller 49 prior to the unloading operation. The predicted power is anticipated based on current operating conditions of the harvester 10 and power needed to unload grain. In other implementations, predicted power is based on current harvesting power and also future operating conditions including power required to unload grain.

If an unloading power is not predicted at block 94, the harvester proceeds to a nominal maximum power operation at block 96. If, however, the unloading power is found to be needed within a certain amount of time, a target power, that determines a target speed required during the harvesting operation while unloading, is determined at block 98. Once determined, the power or speed for the unloading of grain (identified herein as "target power") is displayed to the operator on the display 60. In another implementation, the manual selection by the operator is selectable via a configurable setting. In addition, the current operating power and/or speed, based on the nominal maximum power, is also displayed. Once the target power/speed is displayed, the operator adjusts the speed adjuster 62 to change either the current power level or current speed, i.e., the nominal maximum power, to the power target at block 100. After the operator acquires the power target, the controller 49 applies an amount of unloading power needed to activate the auger 44 and to unload the grain from the bin 43 at block 102. As the nominal maximum power is reduced to the target power, the unloading power becomes available. The unloading power is directed to the auger for its unloading operation. While unloading the crop, the work machine 10 may continue a harvesting operation at a reduced speed, while the wagon or truck receiving the grain moves alongside the work machine 10. In one implementation, the reduced nominal maximum power and the unloading power, when combined, are about the same as the nominal maximum power.

Once the harvester 10 has completed the unloading operation, the unloading power is reduced to zero at block 104. Once the controller 49 has deactivated the unloading power, a new nominal maximum power is displayed on the display 60. In one or more implementations, the new nominal maximum power is the same as the most recent nominal maximum power or is different depending on current operating conditions. Once displayed, the operator returns the harvester 10 to the new nominal maximum power with the speed adjuster 62 at block 106. In the manual mode, the processor is configured to sense when bin is empty, power demand is low, or the operator has disabled the unloading system to automatically return to nominal maximum power. In some implementations, the operator input device 17 includes a user input to override and disable the power reduction logic used to unload crop. When overridden, the operator manually reduces power prior to unloading.

Figure 4:
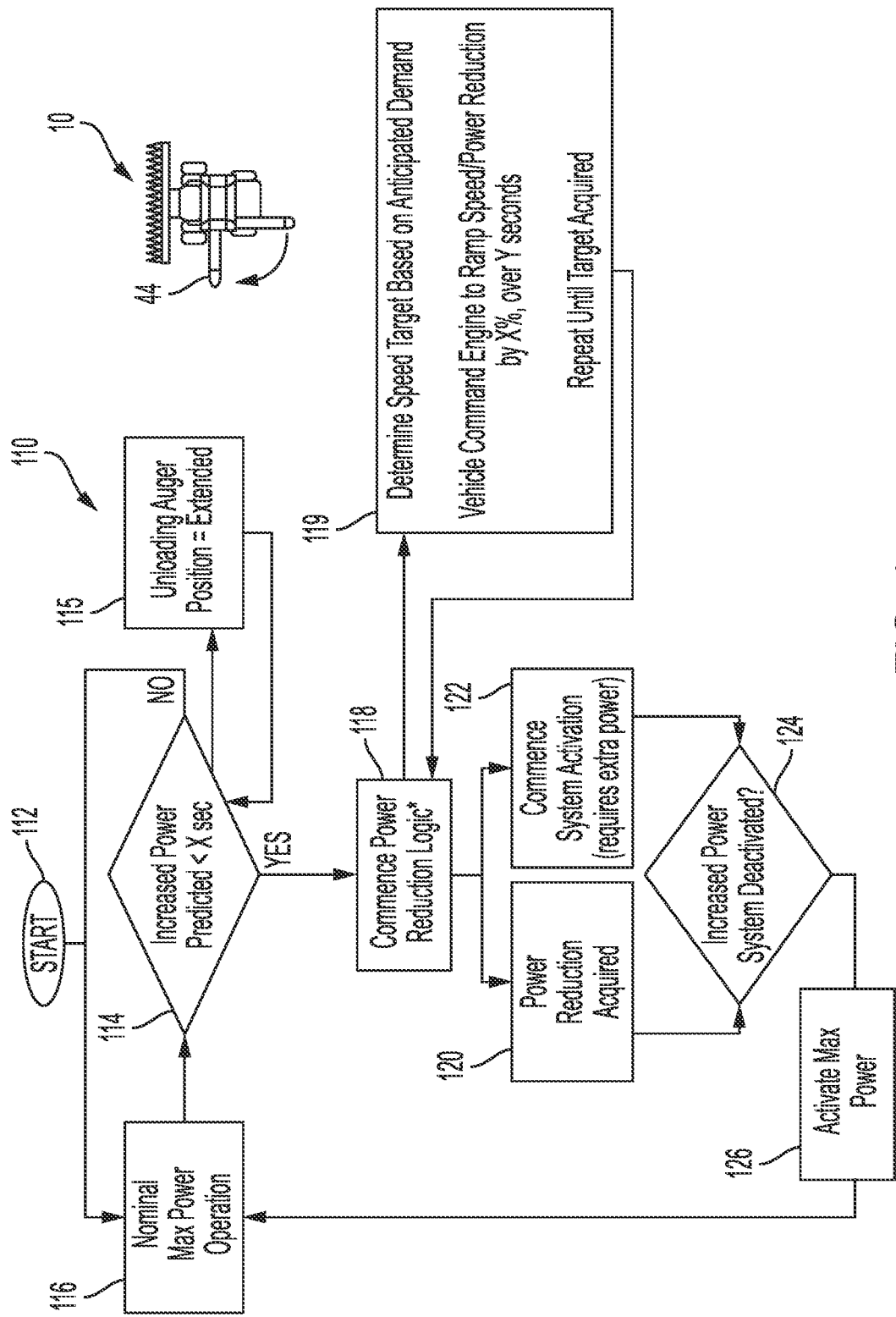
FIG. 4 illustrates one implementation of an example automated operating process for a harvesting machine to manage the power systems.

FIG. 4 illustrates one implementation of an example automated operating process 110 for the work machine 10 to manage the power systems 46 while harvesting crop and unloading the harvested crop. The automated process 110 that begins at start block 112 where the harvester 10 is harvesting crop, while not unloading grain, at a speed based on the nominal maximum power, as described above for block 92. When the work machine 10 is in a fully operational mode while harvesting crop, as described above, the controller 49 determines at block 114, whether an unloading power is needed to unload the grain at block 114. The unloading power is predicted to be needed at a time X which is based on a determination made at block 115 that considers the time at which the auger must be extended for the unloading operation of the harvester 10 with auger 44 in the extended position. The auger 44, however, is not moved to the extended position until the power for unloading is predicted to be needed in X or fewer seconds, wherein X is a predetermined value stored in the memory 78. In one implementation, the value of X is 10 seconds, which is based on the amount of time required for the auger to move from a closed position to the unloading position. In other implementations, the value of X is several minutes based on map based farming (MBF) or predictions of unloading needs. If the unloading power is required at block 114, the controller 49 automatically moves the auger position to an extended position (the unloading position) at block 115. In one or more implementations, the value of X ranges from a time period of 10 seconds to 2 minutes. MBF is one type of a predictive analytics systems that is used to determine unloading needs by a prediction based analysis. Other types or predictive systems are contemplated.

In other implementations and relying on the map data and other inputs, the occurrence of consecutive fully loaded onboard grain bins is predicted. Consequently, multiple consecutive unloading positions of the harvester within a field are determined ahead of time where two or more unloading positions are determined. In a further implementation, the locations for unloading the harvester for an entire field is predicted so that unloading locations are predetermined to optimize harvester speed and unloading locations. In some large scale harvesting operations, more than one grain receiving truck is used. Once full, a first grain receiving truck moves to a grain storage location and a second and different grain receiving truck is used to receive grains being unloaded. Such systems are known as "automated logistics systems" that provide traffic planning in combination with predictions of unloading, including one or more locations and one or more times of unloading. In one example, for instance, an area of the field where excess power is available, such as lower crop yields or easier terrain, for unloading is predetermined.

If an unloading power is not predicted at block 114, the harvester proceeds to the nominal maximum power operation at block 116. If, however, the unloading power is found to be required within a predetermined amount of time, power reduction logic resident in the controller 49 is started by the controller 49 at block 118. The power reduction logic at block 118 determines a speed target based on the anticipated power demand to unload the grain at block 119. Once the speed target is determined, the controller 49 determines a work machine engine command that reduces the engine speed/power by X percent over a period of Y seconds. The controller 49 repetitively determines the reduction in speed until the target speed of the work machine, based on target power is acquired, so that the reduction in speed is not immediate, but occurs over a period of time. Once the reduction in speed is determined to arrive at the target speed, the controller 49 determines that the power reduction is acquired at block 120. At the same time, the system activation is commenced to deliver power for unloading the grain using the auger 44 of while power reduction for the work machine speed is reduced to unload the grain at block 122. Once the harvester 10 has completed the unloading operation, the controller 49 directed the work machine to resume the harvesting speed at block 124. A new nominal maximum power is determined at block 126. In one or more implementations, the new nominal maximum power is the same as the most recent nominal maximum power or is different depending on current operating conditions.

Figure 5:
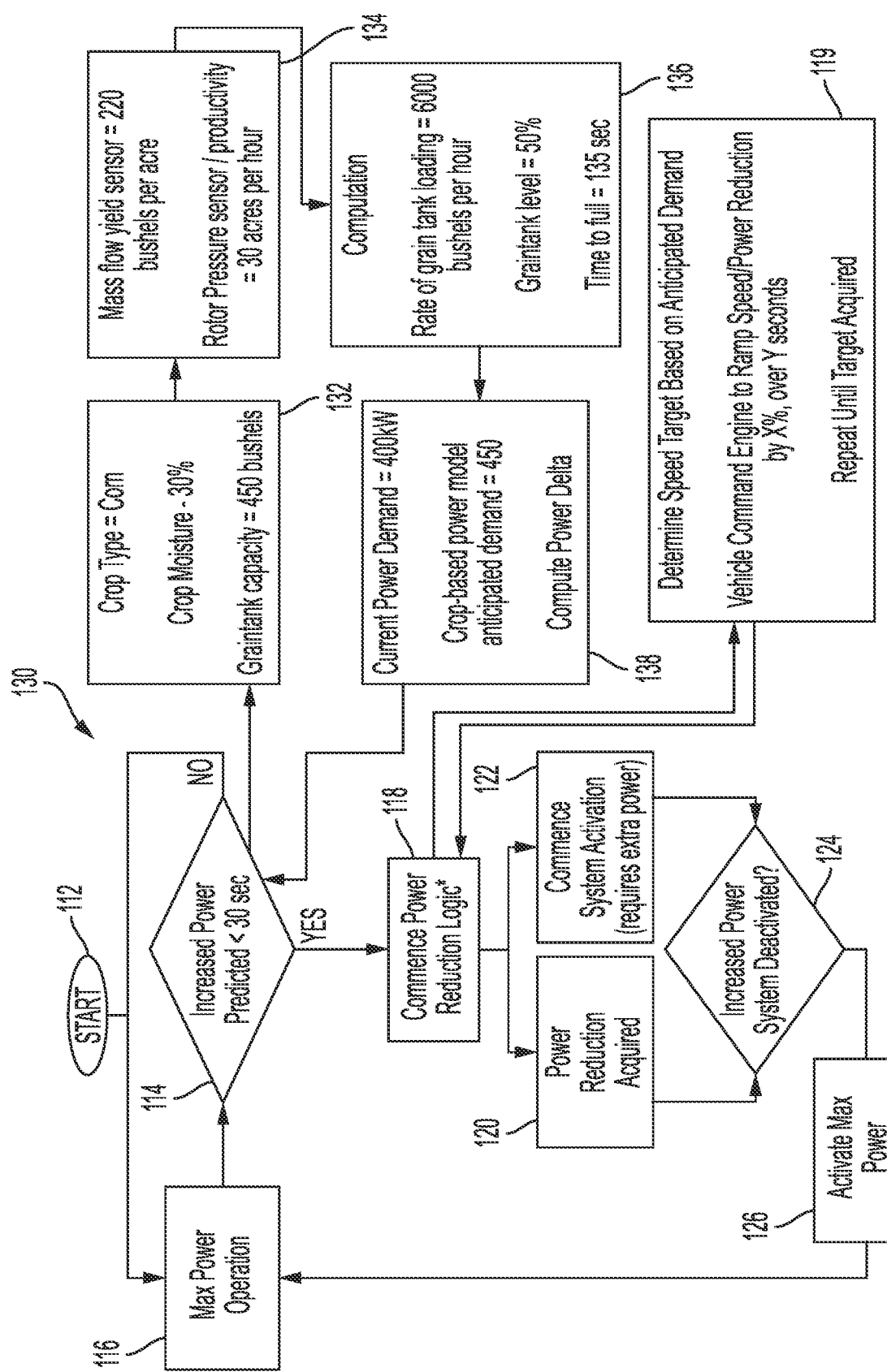
FIG. 5 illustrates a flowchart of one example of a process used in the processing of corn with a harvesting machine.

FIG. 5 illustrates a flowchart of one example of a process 130 used in the processing of corn as the grain. As shown in FIG. 5, the example process includes the blocks 112, 114, 116, 118, 120, 122, 124, and 126, as shown in FIG. 4. At block 114 of FIG. 5, however, the increased predicted unloading power is determined for a time period of 30 seconds before the crop is unloaded. In this implementation, the crop type is corn, the crop moisture is thirty (30) percent and the grain bin 43 capacity is 450 bushels at block 132. The rotor pressure sensor 35 provides in input to determine the crop yield of 200 bushels per acre to the processor 49 at block 134. The machine area counter provides a value of 30 acres per hour. A computation is made by the processor 76 at block 136 to determine an amount of time to fill the bin 43 at the current productivity. Using the value of 200 bushels per acre and the value of 30 acres per hour, the processor 76 determines that the rate of grain bin loading is 6000 bushels per hour. With the grain bin 43 level currently at 50 percent, the time to reach a full bin is 135 seconds.

At block 138, the controller 49 determines that the current power demand for harvesting crop prior to unloading, is about 400 kW, i.e., the nominal maximum power. Based on the crop type being corn as detailed in blocks 132 and 134, a crop based power model determines that the anticipated (predicted) demand is 450 kW. By computing a delta between current power demand and anticipated power demand, a power delta of 50 kW is determined. Consequently, to achieve unloading of corn without exceeding the nominal maximum power of 400 kW, the currently power demand is reduced to 350 kW for the harvesting operation while 50 kW is provided for unloading of corn. In one or more implementations, the crop based power model includes crop types, crop conditions such as moisture and test weight, harvester size and discharge system specifications. The power model, in different implementations, is a table stored in memory, such as a look-up table. The stored models are accessed to determine an allocated boost power for discharging crop.

Once the power delta is computed, the process returns to block 114 as described above. If the increased power demand is required as determined at block 114, the process moves to block 118. At block 118, the target is acquired as described above. Additional steps of the process are completed at blocks 118, 120, 122, 124 and 126 as described above.

Figure 6:
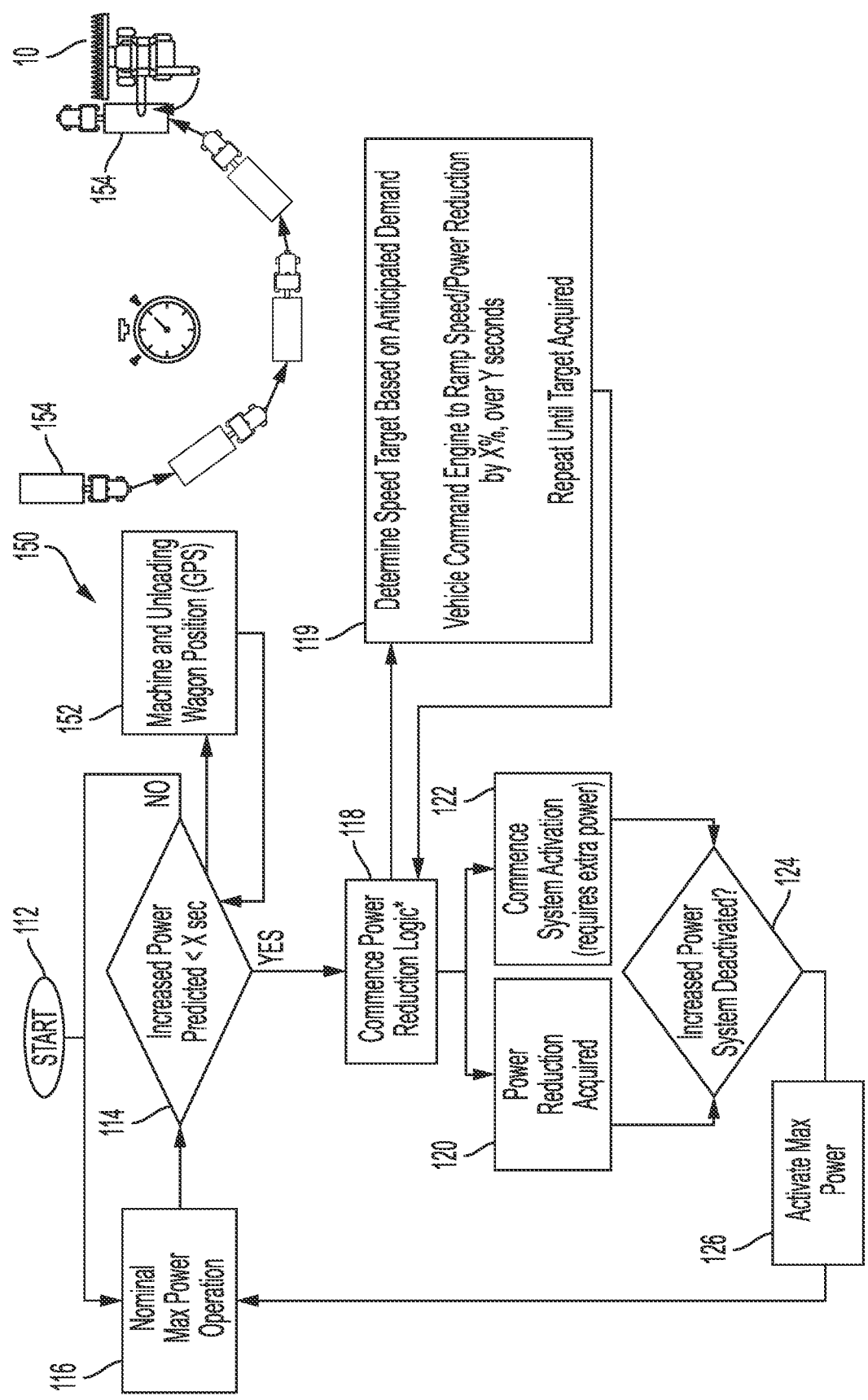
FIG. 6 illustrates a flowchart of one example implementation of a process including a time to discharge harvested crop based on a traffic planning schedule.

In another example implementation as illustrated in a flowchart of in FIG. 6, a process 150 includes a time to unload based on a traffic planning schedule. In this implementation, the example process includes the blocks 112, 114, 116, 118, 120, 122, 124, and 126 as shown in FIG. 4. Block 152, however, provides a position input to determine the amount of time used in block 114 of FIG. 4, for instance, using a global positioning system (GPS) to determine the position of an unloading wagon 154 with respect to a position of the harvester 10. The position of the harvester 10 and the unloading wagon 154 are both determined by the GPS system as is understood by those skilled in the art. Since the crop characteristics as well as rate of grain bin loading are known, a time at which the bin 43 is sufficiently full for unloading can be predicted. Once this time is known at block 114, the unloading wagon 154 is dispatched to the harvester 10 where the unloading wagon 154 intercepts the harvester 10 for unloading of the crop. Estimations of position and travel speed and direction for both the wagon and harvester are used to compute the intercept time to appropriately command the power reduction in time to commence unloading. The harvester may unload the crop even if the bin is not full.

Figure 7:
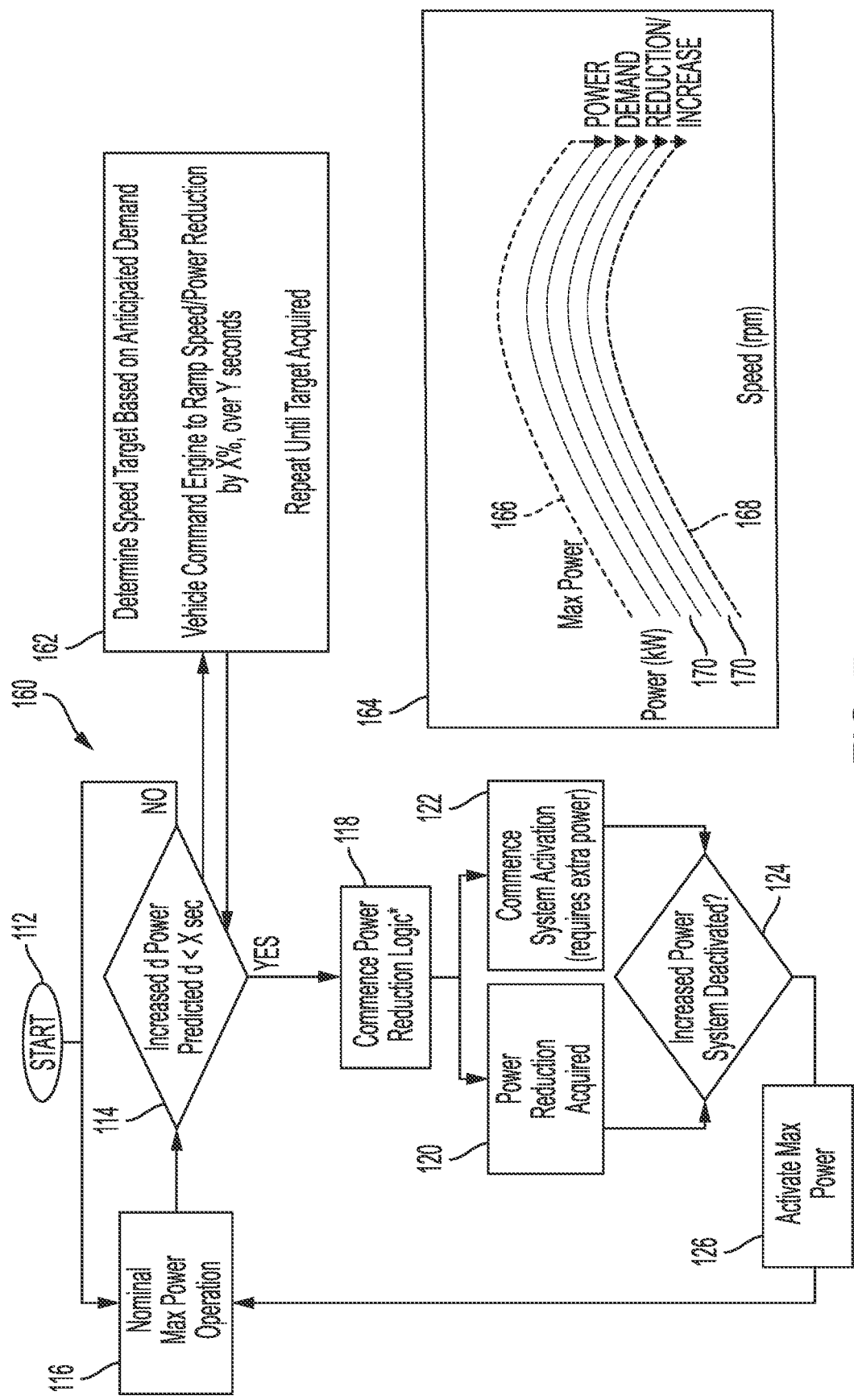
FIG. 7 illustrates a flowchart of an example process for power reduction in a harvesting machine.

In an additional example implementation as illustrated in a flowchart of FIG. 7, a process 160 includes a power reduction process. In this implementation, the example process includes the blocks 112, 114, 116, 118, 120, 122, 124, and 126 of FIG. 4. Block 118, however, illustrates that the power reduction logic includes determining a speed target based on anticipated demand at block 162 that utilizes a plurality of power reduction curves 164. As stated in block 162, the target is acquired iteratively as the processor 76 moves from a maximum power curve 166 to a target power curve 168. The process is iterative as the processor 76 accesses power curves 170 stored in memory 78, which are located between the maximum power curve 166 and the predicted power curve 168. Each of the power curves 166, 168 and 170 are stored in a lookup table stored in the memory 78. The curves have been predetermined based on one or more of the type of harvester, the type of engine, and the types of harvesting systems. In another implementation, each of the power curves is calculated during the harvesting operation. By moving from one stored power curve to the next stored power curve, the target power curve is determined and processing power is reduced, when compared to the power curves that are calculated. In other implementations, a determination of the target power curve is implemented as an algorithm that uses real-time data received from the various harvester sensors, map data, and GPS information.

Figure 8:
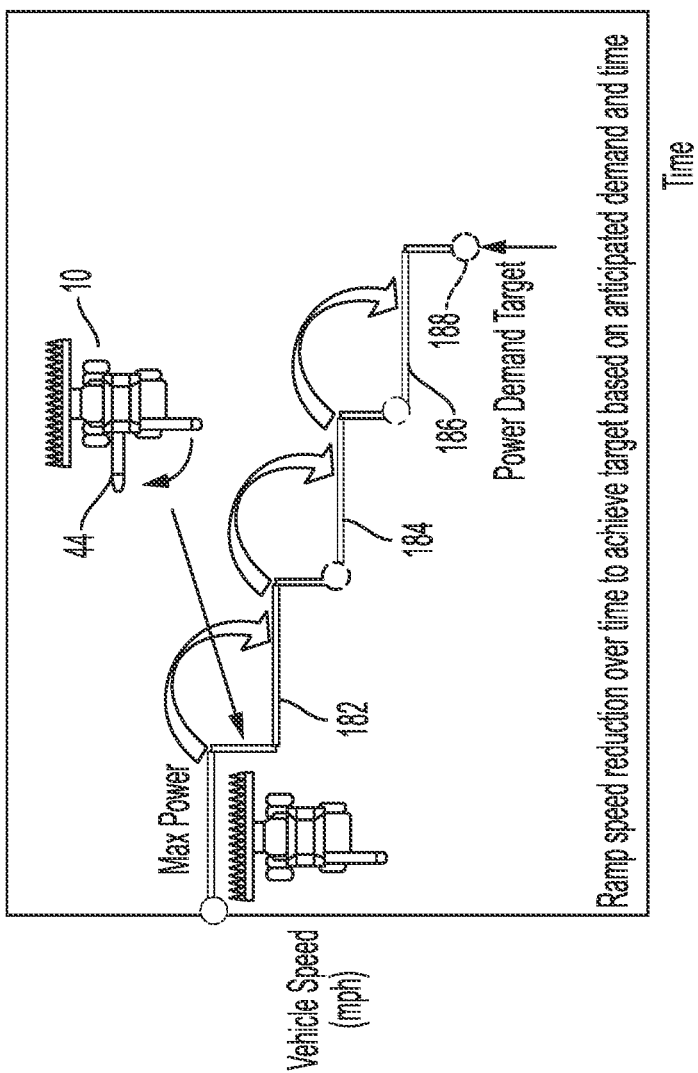
FIG. 8 illustrates a ramp speed reduction over time.

By using the power curves of FIG. 7, a closed loop speed control system of FIG. 8 is provided which gradually reduces the speed of the harvester 10 to the target speed needed to preserve maximum power while unloading the crop. Each of the power curves ramps the work machine speed downward over a period of time to arrive at the power demand target. Initially, the work machine 10 is traveling at a speed using the nominal maximum power 180. The speed is reduced gradually in steps indicated by speed lines 182, 184, and 186, until the power demand target is achieved at power demand target 188. At a transition in speed between speed maximum power and speed 182, the auger 44 is moved to the unloading position. While the auger 44 is moved to the unloading position at speed 188, the auger 44, in other implementations, unloads grain based on other types of predictions for unloading timing, such as grain bin level using grain bin fill level sensors, prior geographic locations, map based unloading used to reduce nominal harvester power and to commence unloading. In one or more implementations, the grain bin fill level sensors includes light sensors, visual or audible alarms, light illumination devices, and site gauges. Once the target power 188 is reached, the wagon 154 is loaded with grain. Once the work machine 10 has completely unloaded the grain, the auger 44 moves to the closed position at which point the speed of work machine increases to the speed provided by nominal maximum power without the power required for unloading. As soon as the crop bin is empty or the unloading system is deactivated, the auger returns to the closed position and the work machine returns to harvesting speed.

In one implementation, when the grain bin reaches the full level, an alert prompts the operator to take action and to move the auger to the unloading position to unload. In some implementations, an exterior beacon light located on the harvester is illuminated to warn wagons that crop unloading is imminent. In some cases, the harvester unloads crop at ¾ full for example. In other implementations, the operator actively monitors that level or crop within the grain bin and signals to the wagon that an unloading event will occur. Such an event is an unloading event that is learned and is based on the time required for the harvester to have a full grain bin and at what location in the field the unloading occurs. In some implementations, the unloading event is a cyclical event that is reoccurring and identifies a location in the field where unloading will occur.

In one implementation, the driver assistance selector 67 of FIG. 2 is changeable between a disengaged position or first state, and an engaged position or second state. In one example, the selector 67 may be movable between positions or states. In another example, the selector 67 may change between positions or states automatically. In the disengaged position, the work machine 10 operates in a manual mode in which the operator manually operates the work machine and its systems while moving the work machine on the road or through a field, including harvesting, or unloading the grain bin when necessary to a wagon or other container. In the manual mode, the engine of the 10 operates at a nominal engine performance as is known by those skilled in the art. The nominal engine performance is based on a factory default operating condition of the engine, for example a 100 kilowatt power curve rating, known as a nominal engine power curve.

When the selector 67 changes to the engaged position, i.e., an automatic mode, the work machine 10 operates a driver assistance system where predetermined automation features are engaged. These automation features include the various operating processes described herein, such as unloading grain with the auger. In some implementations, the selector 67 includes a number of different types of selectors including mechanical selectors, such as mechanical pushbuttons and toggle switches. Other examples of selectors may include capacitive switches and inductive switches which are included at the display 60. Voice activated switches may also be used as a type of selector 67. In further implementations, the controller 49 may automatically control adjustment or changing of positions or states of the selector 67.

In one implementation, the driver assistance selector 67 of FIG. 2 is movable between a disengaged position or first state, and an engaged position or second state. In the disengaged position, the work machine 10 operates in a manual mode in which the operator manually operates the work machine and its systems while moving the work machine on the road or through a field, including harvesting, or unloading the grain tank when necessary to a wagon or other container. In the manual mode, the engine of the work machine 10 operates at a nominal engine performance as is known by those skilled in the art. The nominal engine performance is based on a predefined, factory default operating condition of the engine 50 such as, for example, a 100-kilowatt power curve rating. When operating at the nominal engine performance, the engine 50 is controlled according to a nominal engine power curve.

When the selector 67 is moved to the engaged position, i.e., an automatic mode, the work machine 10 operates a driver assistance system where predetermined automation features are engaged. These automation features include, but are not limited to, the various operating processes described herein, such as unloading grain with the auger. The selector 67 may include a number of different types of selectors including mechanical selectors such as mechanical pushbuttons and toggle switches. Other types of selectors include capacitive switches and inductive switches which are included at the display 60. Voice activated switches may also be used.

Once the operator moves the selector 67 to the engaged position, the power curves of FIG. 7 are accessed by the controller 49 to enable the controller 49 to operate the engine 50 at higher power targets and boost machine productivity. In the engaged position, i.e., the automatic mode, the engine 50 of the work vehicle 10 operates at an enhanced engine performance in which higher power curves greater than the nominal power curves are accessed by the controller 49 for operating the engine 50. These higher power curves allow the engine 50 to run at a higher power than when the engine 50 is controlled according to a nominal power curve. When the engine 50 is controlled according to the higher power curves, there may result in productivity improvements, including when operating in difficult harvesting conditions.

The controller 49 is able to select a power curve from a plurality of power curves to manage a transition when a setpoint is changed either automatically or manually. The setpoint may change when a driver system feature is enabled or disabled, for example, to optimize operator drivability. The driver system feature may be enabled or disabled by an operator or the controller 49. While higher power curves are accessed automatically by the controller 49, in other implementations one or lower power curves or lower power targets may be accessed automatically by the controller 49. A lower power target may be, for example, a power value located on one of the lower power curves. A lower power curve may include one or more power values that are less than power values on the nominal power curve.

In one implementation, when the driver assistance selector 67 is moved to the engaged position to operate the work machine 10 under the automatic control, the selector 67 enables the user to select one power curve of a plurality of power curves. The plurality of power curves may be presented to the operator on a display as power curve targets. The power curve targets may represent a power value on a power curve such as, for example, a maximum power value on the power curve. Selection of a power curve target by the operator enables the controller 49 to access and operate at the engine 50 according to the power curve correspond to the selected power curve target. The plurality of power curves may include the nominal power curve, one or lower power curves, and one or more higher power curves.

Each of the plurality of power curves may include power limits such as, for example, not to exceed 80%, 100%, 105%, 110%, or 114% of a power value on the nominal power curve. In one example, a lower power curve may have a power limit that does not exceed 80% of a power limit on the nominal power curve. In this example, the power limit on the lower power curve may correspond to a maximum power value on the lower power curve. Here, the maximum power value on the lower power curve may not exceed 80% of a maximum power value (or power limit) on the nominal power curve. In another example, a higher power curve may have a power limit that does not exceed 110% of a power limit on the nominal power curve. In this example, the power limit on the higher power curve may correspond to a maximum power value on the higher power curve, and this maximum power value on the higher power curve may not exceed 110% of a maximum power value (or power limit) on the nominal power curve. In further examples, a power curve may have a power limit defined as a range, e.g., not to exceed 100-110% of a power limit on the nominal power curve. Thus, if the selector 67 is moved to the engaged position, the controller 49 may control the engine 50 to operate along the selected higher or lower power curve. If, however, selector 67 is moved to the disengaged position, the automatic mode is disabled and the controller 49 transitions the engine 50 to operate according to a lower power curve having a reduced power to preserve a power bulge when operating in the manual operator mode.

In one implementation, the lower power curve is selectable by the user when the selector 67 is moved to the disengaged position. When the operator selects automatic control, i.e., moves the selector 67 to the engaged position, the transition from the manual mode to the automatic mode is controlled by the controller 49 to ensure stable operation of the work machine 10, for instance, to preserve work machine drivability while completing harvesting tasks. Work machine drivability may include work machine speed.

In one implementation, the transition to a different power curve upon selection of the automatic mode may be executed by the controller 49 immediately, i.e., as instantly as a work vehicle CAN bus message can be transmitted to the engine 50. The amount of time that elapses during the transition between controlling the engine 50 from a first power curve to a second power curve may include a short transition period, e.g., 10-15 seconds, or a longer transition period, e.g., approximately one minute or longer. The transition period may depend on an engine type and driver assistance features being offered by the engine manufacturer. In one or more implementations, transition periods may be tuned by the controller 49 based on a setting determined by the operator which enables the aggressiveness of the transition between power curves.

In the manual mode, the work machine 10 may be operated at a 100% power curve while harvesting. The 100% power curve may correspond with the nominal power curve that is predefined and set at the factory of the engine manufacturer. The work machine power may be reduced below 100% power to allow for there to be power available and used to unload grain to the wagon or container.

In one implementation, the processor 76 of the controller 49 may access different power curves stored in the memory 78, depending on whether the work machine 10 is operating in the automatic or manual mode. The processor 76 is able to set the time at which each succeeding power curve is accessed by the controller 49. Setting the time can reduce or prevent operator discomfort resulting from changes in work machine speed between each succeeding power curve. For example, there is generally a transition in work machine speed when moving between automatic mode and manual mode. In one implementation, the amount of time that elapses between the transition between one power curve to the next power curve is based on the type of work machine in use and the conditions that exist during a harvesting operation. For instance, the transition between power curves when operating the work machine 10 on a flat terrain can be different for the transition between power curves when operating the work machine 10 on a hilly terrain. The 100% power curve (i.e., the nominal power curve) and the 110% power curve, i.e., a higher power curve, may be based on engine type. In one or more implementations, the power value along the 100% power curve may vary based on the machine model, the engine powertrain, different crop types, and operator preferences.

Figure 9:
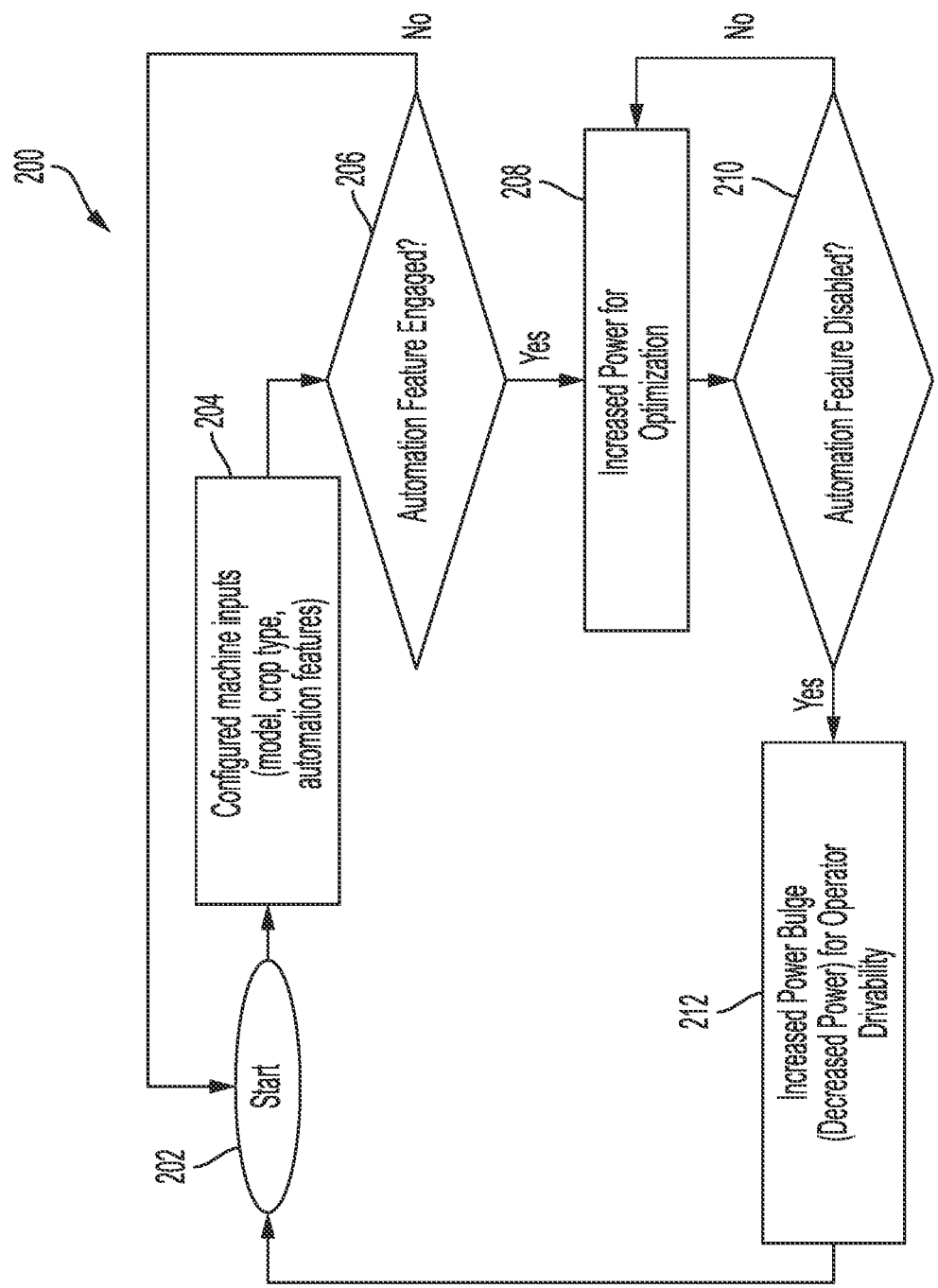
FIG. 9 illustrates a flowchart of one example implementation of a process used to transition between a manual mode and an automatic mode.

In one implementation shown in FIG. 9, a flowchart illustrates a process 200 used to transition between the manual mode and the automatic mode. In this implementation, the process 200 begins at start block 202 where the memory 78 includes stored machine inputs at block 204. The machine inputs may include the type or model of the work machine 10, the engine type, the crop type, one or more available power curves, and automation features such as the power curves and the transition times. The controller 49, which receives an input from the driver assistance selector 67, determines if the automation feature is engaged at block 206. The automation feature is engaged when the selector 67 is moved to the engaged position. If the automation feature is not engaged, i.e., the selector 67 is in the disengaged position, the process 200 returns to the start block 202. If the automation is engaged in block 206, the work machine power is increased for optimization of the work machine operations at block 208. In one implementation, the work machine power may be increased to the maximum power curve 166 shown in FIG. 7. The controller 49 continues to monitor the selector 67 to identify if the state of the selector 67 has changed to disable the automation feature in block 210. If not, the process 200 returns to block 208 where the engine 50 continues to operate at an increased power. If, however, the automation feature has been disabled, the power bulge is increased with a decreased nominal or rated power for operator drivability at block 212. If the feature is disabled, the work machine 10 power demand transitions from the maximum power curve 166 of FIG. 7 to a reduced power, for example, on the reduced power curve 168 of FIG. 7.

Figure 10:
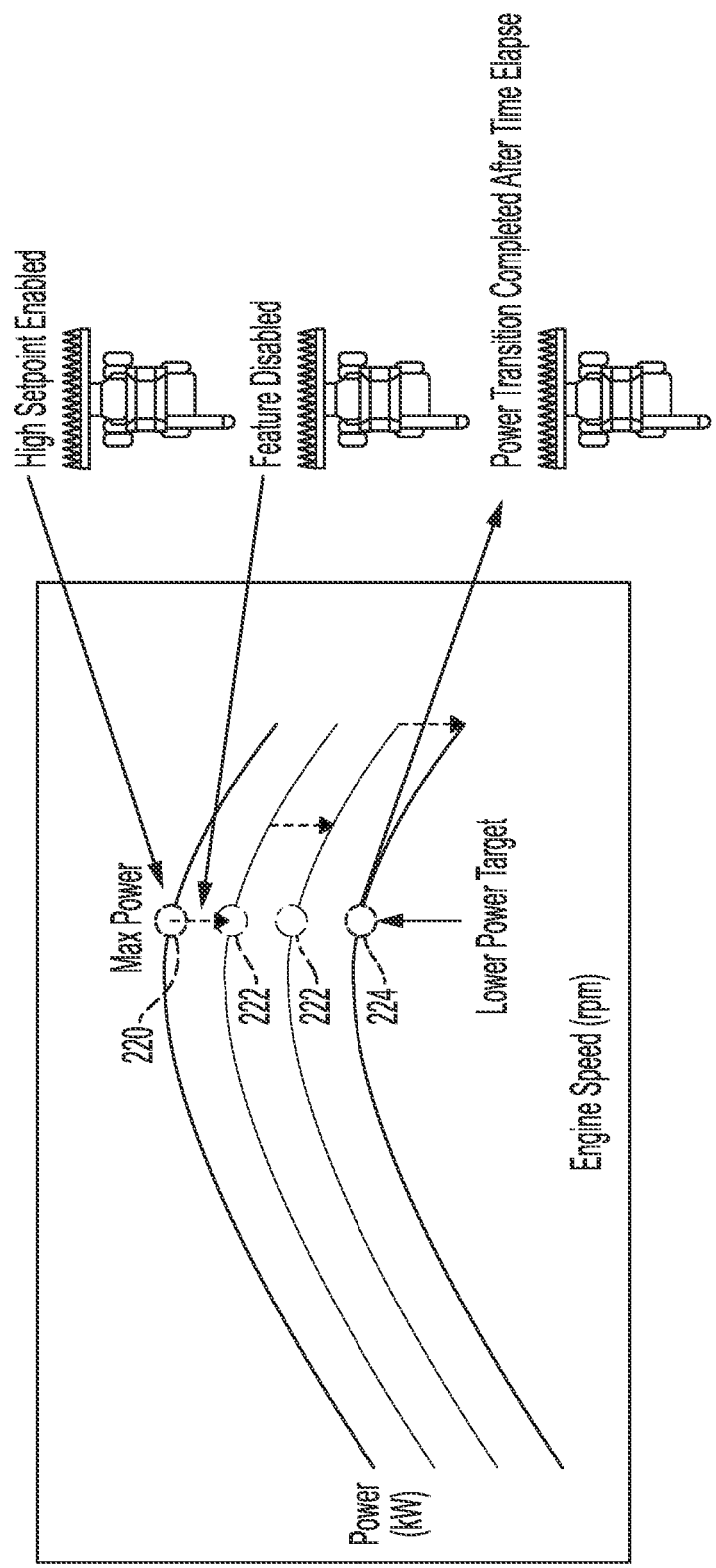
FIG. 10 are graphs illustrating one implementation of a power reduction approach that transitions from a maximum power target to a lower power target over a period of time.

In one implementation of the present disclosure, if the automation feature is engaged at block 206 of FIG. 9, a maximum power curve 220 of FIG. 10 may be identified by the controller 49 for work machine operation. Depending on work machine speed, the work machine 10 may operate at one of the power values along the power curve 220. As long as the automation feature remains engaged in block 206, the work machine 10 may operate along the maximum power curve 220 when possible based on which work machine features are engaged and harvesting power demands. Once the automation feature is disengaged, i.e., the selector 67 is moved to the disengaged position, the work machine may transition to a power reduction scheme where the engine 50 is operated along the nominal power curve or a lower power curve, for example.

In FIG. 10, one implementation of a power reduction approach is illustrated in which the engine 50 can be controlled according to a plurality of power curves 220, 222, 224. In this implementation, the engine 50 may be controlled according to a first or maximum power curve 220. The first or maximum power curve 220 may allow the engine 50 to operate at higher power values than when operating according to the other of the plurality of power curves. A power transition may be made from the maximum power curve 220 to an intermediate reduced power curve 222 or a lower power curve 224. In FIG. 10, the plurality of power curves includes at least two intermediate power curves 222. In another implementation, the plurality of power curves may include one intermediate power curve 222. In other implementations, the plurality of power curves may include three or more intermediate power curves 222. The period of time for transitioning from the maximum power curve 220 to the lower power curve 224 is made over a predetermined period of time. The predetermined time period depends on a number of factors including, for instance, work machine type, user preference, harvest conditions, or field obstacles such as ground conditions, crop conditions, and terrain features. These factors are typically identified prior to the start of work machine operations and are used to determine maximum power setpoints along the maximum power curve 220. In one implementation, as the work machine transitions from the maximum power 220 to the lower power curve 224, the work machine speed may be reduced. In another implementation, the work machine speed may remain the same. In yet another implementation, the work machine speed may increase.

In some implementations, the maximum power curve 220, intermediate power curves 222, and lower power curve 224 may be selectable through the operator input device 17. In other implementations, when operating in the automatic mode (i.e., the selector 67 is in the engaged position), the controller 49 may access different power curves and select one of the power curves to operate the engine 50 at a corresponding selected power target. The controller 49 may also transition at varying levels of aggressiveness from one power curve to another power curve. The aggressiveness of the transition includes time and/or a rate of change for making the transition.

In one implementation, an engine 50 may be controlled according to one of a plurality of power curves. The controller 49 may control the transition from one power curve to another power curve. The time period for transitioning between successive power curves may be the same such that the reduction in work machine speed over the period of time is linear from a highest power curve (i.e., a maximum power curve) to a lowest power curve (i.e., a minimum power curve). In another implementation, the time period for transitioning between successive power curves may not be the same. In this implementation, the power reduction from the maximum power curve, for example, to the lowest power curve may be such that the reduction in work machine speed is non-linear.

As described herein, one or more of the implementations enables work machine automation to unlock more capacity from the work machine and the harvest system. Higher power utilization is provided for productivity improvements, including under difficult harvesting conditions. In one or more implementations, operator preferences such as whether to operate in the manual mode or in the automatic mode may be selectable by the operator or set by the manufacturer, another user, or a maintenance person. The automation setpoints and targets are configurable. In some implementations, when the driver assistance feature is either on or is off, transition characteristics between power targets or power curves may be selectable. The transition characteristics may include, for example, enabling a rate of change between power targets or curves, or a sensitivity between power targets or power curves. The sensitivity between power targets or power curves may define how aggressively the transition is between the power targets or power curves. For example, the sensitivity may identify how quickly a transition is made between a higher power target to a lower power target. In one or more implementations, the transition between power targets may be instantaneous, include a short transition (i.e., a short delay), or include a longer transition, i.e., a significant delay.

The present disclosure also enables the functionality of a control algorithm so an improvement in the non-linear control scheme may be achieved. The present disclosure further provides a method to manage a transition between a higher rated power at a first rated speed to a lower rated power at a second rated speed. Furthermore, the described control feature manages the transition of work machine power and/or ground speed based on setpoint adjustment, feature state change, or other characteristics to preserve work machine drivability and system performance. The controls may proactively control the work machine down from a maximum power target to a nominal power target to complete harvesting work machine tasks. The feature may enable a greater power for normal harvesting conditions without sacrificing the power boost necessary to maintain work machine drivability when activating the systems generally associated with boost power demand.

While exemplary implementations incorporating the principles of the present disclosure have been described herein, the present disclosure is not limited to such implementations. For instance, while a harvester for grain has been described in detail, other harvesters for crops, such as a picker for cotton and harvester for cotton are included. In one example, once a bale of crop is completely formed, a gate is opened where the bale may be discharged from the baler and onto a bale handler. The bale handler is positionable between a relatively upright position and a relatively horizontal position for unloading the bale. An end of the bale handler moves to a position toward the ground where the bale falls for later processing. Consequently, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A method of controlling power of an engine of a work machine during a harvesting operation, the method comprising:
   identifying a state of a driver assistance selector, the driver assistance selector being changeable between a first state and a second state;
   in the first state, operating the work machine in a manual mode and the engine according to a first power curve, the first power curve including a first plurality of power values based on engine speed;
   in the second state, operating the work machine in an automatic mode and the engine according to a second power curve, the second power curve being one of a plurality of power curves selectable in the automatic mode and including a second plurality of power values based on engine speed, where each of the second plurality of power values is greater than a corresponding power value of the first plurality of power values of the first power curve at a given engine speed;

determining if the driver assistance selector is changed from the second state to the first state; and when it is determined that the driver assistance selector is changed from the second state to the first state, transitioning the work machine from the automatic mode to the manual mode and the engine from operating according to the second power curve to the first power curve over a period of time.

2. The method of claim 1, wherein the operating the work machine in the automatic mode comprises operating the engine at a target power value that is greater than the corresponding power value of the first power curve at the given engine speed.

3. The method of claim 2, wherein the operating the work machine in the automatic mode comprises operating the engine at the target power of at least 110% of a maximum power value of the first plurality of power values on the first power curve.

4. The method of claim 2, wherein the operating the work machine in the automatic mode comprises operating the engine at the target power of between 100% and 110% of a maximum power of the first plurality of power values on the first power curve.

5. The method of claim 1, wherein operating the work machine in the manual mode comprises operating the engine at a first maximum power value of the first plurality of power values on the first power curve, wherein operating the work machine in the automatic mode comprises operating the engine at a second maximum power value of the second plurality of power values on the second power curve, the second maximum power value being greater than the first maximum power value.

6. The method of claim 5, further comprising operating the engine according to a third power curve of the plurality of power curves, the third power curve comprising a third maximum power, where the third maximum power is less than first maximum power.

7. The method of claim 1, wherein the transitioning the work machine comprises transitioning the engine over a period of time from operating between two successive power curves of the plurality of power curves, wherein the period of time is the same when transitioning the engine between any two successive power curves.

8. The method of claim 1, wherein the transitioning the work machine comprises transitioning the engine over a period of time from operating between two successive power curves of the plurality of power curves, wherein the period of time is different when transitioning the engine between any two successive power curves.

9. The method of claim 1, further comprising controlling the work machine at a predefined speed when operating in the automatic mode.

10. The method of claim 9, wherein the transitioning the work machine from the automatic mode to the manual mode comprises transitioning to the manual mode if the work machine is operating at the predefined speed.

11. A work machine including a harvesting system comprising:

an engine configured to output power based on one of a plurality of power curves including a first power curve comprising a first plurality of power values based on engine speed and a second power curve comprising a second plurality of power values based on engine speed, where each of the second plurality of power values of the second power curve is greater than a corresponding power value of the first plurality of power values of the first power curve at a given engine speed;

an auxiliary power system operatively coupled to the engine and configured to output power to the harvesting system;

a driver assistance selector being changeable between a manual mode and an automatic mode;

a sensor operatively coupled to a crop storage apparatus;

a controller operatively coupled to the engine, the sensor, and to the auxiliary power system, the controller including:

a processer; and a memory configured to store program instructions, the processor configured to execute the stored program instructions to:

identify if the driver assistance selector is in the manual mode or in the automatic mode;

when the identified driver assistance selector is in the manual mode, operate the engine according to the first power curve;

when the identified driver assistance selector is in the automatic mode, operate the engine according to the second power curve, the second power curve being one of a plurality of power curves selectable in the automatic mode;

receive a signal from the sensor, the signal being indicative of the condition of harvested crop in the crop storage apparatus;

determine based on the signal when to perform an unloading operation of the harvested crop in the crop storage apparatus;

reduce a speed of the work machine from a first harvest speed to a reduced harvest speed before the unloading operation;

perform the unloading operation; and after the unloading operation, increase the speed of the work machine from the reduced harvest speed to the first harvest speed.

12. The work machine of claim 11, wherein the first power curve comprises a first maximum target power value and the second power curve comprises a second maximum target power value, the second maximum target power value being greater than the first maximum target power value.

13. The work machine of claim 12, wherein the second maximum target value power is at least 110% of the first maximum target power value.

14. The work machine of claim 11, wherein the transition from the second power curve to the first power curve comprises a linear decrease in power over the predetermined period of time.

15. The work machine of claim 11, wherein the transition from the second power curve to the first power curve comprises a non-linear decrease in power over the predetermined period of time.

16. A method of controlling power of an engine of a work machine during a harvesting operation, the method comprising:

providing a plurality of power curves including a first power curve including a first plurality of power values based on engine speed and a second power curve including a second plurality of power values based on engine speed, where each of the second plurality of power values of the second power curve is greater than a corresponding power value of the first plurality of power values of the first power curve at a given engine speed;

identifying a state of a driver assistance selector, the driver assistance selector being changeable between a first state and a second state;

in the first state, operating the work machine in a manual mode and the engine according to only the first power curve;

in the second state, operating the work machine in an automatic mode and the engine according to the second power curve;

controlling a speed of the work machine at a predetermined speed in the second state;

determining if the driver assistance selector is changed from the second state to the first state; and when the driver assistance selector is moved to the first state:

transitioning the work machine from the automatic mode to the manual mode, adjusting the engine from operating according to the second power curve to the first power curve over a period of time, and controlling the speed of the work machine to the predetermined speed.

17. The method of claim 16, wherein the adjusting the engine comprises a linear reduction of power from the engine over the period of time.

18. The method of claim 16, wherein the adjusting the engine comprises a non-linear reduction of power from the engine over the period of time.

* * * * *